United States Patent
Wagner et al.

(10) Patent No.: US 12,410,011 B2
(45) Date of Patent: *Sep. 9, 2025

(54) SYSTEMS AND METHODS FOR PROCESSING OBJECTS INCLUDING AN AUTO-SHUTTLE SYSTEM

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, White Plains, NY (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Gibsonia, PA (US); Thomas Koletschka, Somerville, MA (US); Michael Cap Koval, Mountain View, CA (US); Kyle Maroney, Saunderstown, RI (US); Matthew T. Mason, Atlanta, GA (US); William Chu-Hyon McMahan, North Cambridge, MA (US); Gene Temple Price, Somerville, MA (US); Joseph Romano, Arlington, MA (US); Daniel Carlton Smith, Wexford, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,025

(22) Filed: Jan. 30, 2024

(65) Prior Publication Data

US 2024/0262624 A1     Aug. 8, 2024

Related U.S. Application Data

(63) Continuation of application No. 17/739,735, filed on May 9, 2022, now Pat. No. 11,932,489, which is a (Continued)

(51) Int. Cl.
    *B65G 1/137*     (2006.01)
    *B07C 3/00*      (2006.01)
    (Continued)

(52) U.S. Cl.
    CPC ............. *B65G 1/137* (2013.01); *B07C 3/00* (2013.01); *B07C 3/008* (2013.01); *B25J 9/0093* (2013.01);
    (Continued)

(58) Field of Classification Search
    CPC .... B65G 1/137; B65G 1/0485; B65G 1/1373; B65G 47/82; B65G 47/90; B65G 47/905;
    (Continued)

(56) References Cited

U.S. PATENT DOCUMENTS

| | | |
|---|---|---|
| 3,734,286 A | 5/1973 | Simjian |
| 4,186,836 A | 2/1980 | Wassmer et al. |

(Continued)

FOREIGN PATENT DOCUMENTS

| | | |
|---|---|---|
| AU | 2006204622 A1 | 3/2007 |
| CA | 2985166 A1 | 12/2016 |

(Continued)

OTHER PUBLICATIONS

Communication pursuant to Rules 161(1) and 162 EPC issued by the European Patent Office in related European Patent Application No. 18716428.0 on Nov. 4, 2019, 3 pages.

(Continued)

*Primary Examiner* — Thomas Randazzo
(74) *Attorney, Agent, or Firm* — Gesmer Updegrove LLP

(57) ABSTRACT

A storage, retrieval and processing system for processing objects is disclosed. The storage, retrieval and processing (Continued)

system includes a plurality of storage bins providing storage of a plurality of objects, where the plurality of storage bins is in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and a movable carriage for receiving the selected object from the end effector of the programmable motion device, and for carrying the selected object to one of a plurality of destination bins.

29 Claims, 21 Drawing Sheets

Related U.S. Application Data continuation of application No. 16/744,862, filed on Jan. 16, 2020, now Pat. No. 11,365,051, which is a continuation of application No. 15/924,883, filed on Mar. 19, 2018, now Pat. No. 10,583,553.

(60) Provisional application No. 62/473,843, filed on Mar. 20, 2017.

(51) Int. Cl.
| | |
|---|---|
| *B25J 9/00* | (2006.01) |
| *B25J 9/02* | (2006.01) |
| *B25J 9/16* | (2006.01) |
| *B65G 1/04* | (2006.01) |
| *B65G 47/82* | (2006.01) |
| *B65G 47/90* | (2006.01) |
| *B65G 65/00* | (2006.01) |
| *G06Q 10/087* | (2023.01) |

(52) U.S. Cl.
CPC ............ *B25J 9/026* (2013.01); *B25J 9/1612* (2013.01); *B25J 9/1615* (2013.01); *B65G 1/0485* (2013.01); *B65G 1/1373* (2013.01); *B65G 47/82* (2013.01); *B65G 47/90* (2013.01); *B65G 47/905* (2013.01); *B65G 65/005* (2013.01); *G06Q 10/087* (2013.01); *B65G 2201/0258* (2013.01)

(58) Field of Classification Search
CPC .......... B65G 65/005; B65G 2201/0258; B65G 1/04; B07C 3/00; B07C 3/008; B25J 9/0093; B25J 9/026; B25J 9/1612; B25J 9/1615; G06Q 10/087
See application file for complete search history.

(56) References Cited

U.S. PATENT DOCUMENTS

| | | | |
|---|---|---|---|
| 4,244,459 A | 1/1981 | Garrett | |
| 4,678,390 A | 7/1987 | Bonneton et al. | |
| 4,722,653 A | 2/1988 | Williams et al. | |
| 4,759,439 A | 7/1988 | Hartlepp | |
| 4,819,784 A | 4/1989 | Sticht | |
| 4,846,335 A | 7/1989 | Hartlepp | |
| 4,895,242 A * | 1/1990 | Michel .................. | B65G 47/965 |
| | | | 198/704 |
| 5,082,103 A | 1/1992 | Ross et al. | |
| 5,190,162 A | 3/1993 | Hartlepp | |
| 5,419,457 A | 5/1995 | Ross et al. | |
| 5,460,271 A | 10/1995 | Kenny et al. | |
| 5,595,263 A | 1/1997 | Pignataro | |
| 5,628,408 A | 5/1997 | Planke et al. | |
| 5,794,788 A | 8/1998 | Massen | |
| 5,839,566 A | 11/1998 | Bonnet | |
| 6,011,998 A | 1/2000 | Lichti et al. | |
| 6,059,092 A | 5/2000 | Jerue et al. | |
| 6,079,570 A | 6/2000 | Oppliger et al. | |
| 6,124,560 A | 9/2000 | Roos et al. | |
| 6,131,372 A | 10/2000 | Pruett | |
| 6,208,908 B1 | 3/2001 | Boyd et al. | |
| 6,246,023 B1 | 6/2001 | Kugle | |
| 6,323,452 B1 | 11/2001 | Bonnet | |
| 6,377,867 B1 | 4/2002 | Bradley et al. | |
| 6,390,756 B1 | 5/2002 | Isaacs et al. | |
| 6,401,936 B1 | 6/2002 | Isaacs et al. | |
| 6,505,093 B1 | 1/2003 | Thatcher et al. | |
| 6,579,053 B1 | 6/2003 | Grams et al. | |
| 6,685,031 B2 | 2/2004 | Takizawa | |
| 6,688,459 B1 | 2/2004 | Bonham et al. | |
| 6,762,382 B1 * | 7/2004 | Danelski .............. | B65G 17/002 |
| | | | 209/912 |
| 6,779,647 B1 | 8/2004 | Nagler | |
| 6,897,395 B2 | 5/2005 | Shiibashi et al. | |
| 6,946,612 B2 | 9/2005 | Morikawa | |
| 7,728,244 B2 | 6/2010 | DeLeo et al. | |
| 8,662,314 B2 | 3/2014 | Jones et al. | |
| 8,776,694 B2 | 7/2014 | Rosenwinkel et al. | |
| 9,020,632 B2 | 4/2015 | Naylor | |
| 9,102,336 B2 | 8/2015 | Rosenwinkel | |
| 9,272,845 B2 | 3/2016 | Honkanen et al. | |
| 9,346,083 B2 | 5/2016 | Stone | |
| 9,364,865 B2 | 6/2016 | Kim | |
| 9,481,518 B2 | 11/2016 | Neiser | |
| 9,751,693 B1 * | 9/2017 | Battles .................. | B25J 9/0084 |
| 9,878,349 B2 | 1/2018 | Crest et al. | |
| 9,926,138 B1 | 3/2018 | Brazeau et al. | |
| 9,931,673 B2 | 4/2018 | Nice et al. | |
| 9,962,743 B2 | 5/2018 | Bombaugh et al. | |
| 9,975,148 B2 | 5/2018 | Zhu et al. | |
| 10,007,827 B2 | 6/2018 | Wagner et al. | |
| 10,029,865 B1 | 7/2018 | McCalib, Jr. et al. | |
| 10,058,896 B2 | 8/2018 | Hicham et al. | |
| 10,583,553 B2 * | 3/2020 | Wagner ............... | B65G 1/0485 |
| 11,365,051 B2 | 6/2022 | Wagner et al. | |
| 11,932,489 B2 * | 3/2024 | Wagner ............... | B65G 65/005 |
| 2001/0038784 A1 | 11/2001 | Peltomaki | |
| 2002/0092801 A1 | 7/2002 | Dominguez | |
| 2002/0157919 A1 | 10/2002 | Sherwin | |
| 2002/0179502 A1 | 12/2002 | Cerutti et al. | |
| 2003/0014376 A1 | 1/2003 | DeWitt et al. | |
| 2003/0034281 A1 | 2/2003 | Kumar | |
| 2003/0038065 A1 | 2/2003 | Pippin et al. | |
| 2003/0075051 A1 | 4/2003 | Watanabe et al. | |
| 2003/0135300 A1 | 7/2003 | Lewis | |
| 2004/0194428 A1 | 10/2004 | Close et al. | |
| 2004/0261366 A1 | 12/2004 | Gillet et al. | |
| 2005/0002772 A1 | 1/2005 | Stone | |
| 2005/0220600 A1 | 10/2005 | Baker et al. | |
| 2006/0070929 A1 | 4/2006 | Fry et al. | |
| 2007/0209976 A1 | 9/2007 | Worth et al. | |
| 2008/0181753 A1 * | 7/2008 | Bastian ................ | B65G 1/1376 |
| | | | 414/277 |
| 2009/0026017 A1 | 1/2009 | Freudelsperger | |
| 2010/0122942 A1 | 5/2010 | Harres et al. | |
| 2010/0318216 A1 | 12/2010 | Faivre et al. | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2011/0320036 A1 | 12/2011 | Freudelsperger | |
| 2012/0118699 A1 | 5/2012 | Buchmann et al. | |
| 2012/0219397 A1 | 8/2012 | Baker et al. | |
| 2012/0328397 A1 | 12/2012 | Yamashita | |
| 2013/0110280 A1 * | 5/2013 | Folk ........ | B25J 9/0093 |
| | | | 700/215 |
| 2014/0086709 A1 | 3/2014 | Kasai | |
| 2014/0086714 A1 | 3/2014 | Malik | |
| 2014/0244026 A1 * | 8/2014 | Neiser .................. | B65G 1/1378 |
| | | | 700/216 |
| 2014/0277693 A1 | 9/2014 | Naylor | |
| 2014/0291112 A1 | 10/2014 | Lyon et al. | |
| 2014/0364998 A1 | 12/2014 | Neiser et al. | |

(56) References Cited

U.S. PATENT DOCUMENTS

| | | | |
|---|---|---|---|
| 2015/0073589 A1* | 3/2015 | Khodl | G06Q 50/40 700/218 |
| 2015/0098775 A1 | 4/2015 | Razumov | |
| 2015/0114799 A1 | 4/2015 | Hansl et al. | |
| 2015/0375880 A1 | 12/2015 | Ford et al. | |
| 2016/0075521 A1 | 3/2016 | Puchwein et al. | |
| 2016/0107848 A1 | 4/2016 | Baker | |
| 2016/0176638 A1* | 6/2016 | Toebes | G05D 1/0282 701/25 |
| 2016/0199884 A1 | 7/2016 | Lykkegaard et al. | |
| 2016/0221762 A1 | 8/2016 | Schroader | |
| 2016/0228921 A1 | 8/2016 | Doublet et al. | |
| 2016/0244262 A1* | 8/2016 | O'Brien | B25J 9/16 |
| 2016/0347545 A1 | 12/2016 | Lindbo et al. | |
| 2017/0043953 A1 | 2/2017 | Battles et al. | |
| 2017/0066597 A1 | 3/2017 | Hiroi | |
| 2017/0080566 A1 | 3/2017 | Stubbs et al. | |
| 2017/0106532 A1 | 4/2017 | Wellman et al. | |
| 2017/0121113 A1 | 5/2017 | Wagner et al. | |
| 2017/0121114 A1 | 5/2017 | Einav et al. | |
| 2017/0136632 A1 | 5/2017 | Wagner et al. | |
| 2017/0157648 A1 | 6/2017 | Wagner et al. | |
| 2017/0157649 A1 | 6/2017 | Wagner et al. | |
| 2017/0225330 A1 | 8/2017 | Wagner et al. | |
| 2017/0322561 A1 | 11/2017 | Stiernagle | |
| 2017/0349385 A1 | 12/2017 | Moroni et al. | |
| 2018/0085788 A1 | 3/2018 | Engel et al. | |
| 2018/0244473 A1 | 8/2018 | Mathi et al. | |
| 2018/0273295 A1 | 9/2018 | Wagner et al. | |
| 2020/0147789 A1 | 5/2020 | Wagner et al. | |
| 2020/0156871 A1 | 5/2020 | Fosnight et al. | |
| 2021/0221618 A1 | 7/2021 | Austrheim | |
| 2022/0072587 A1 | 3/2022 | Gealy et al. | |
| 2022/0258975 A1 | 8/2022 | Wagner et al. | |
| 2023/0021155 A1 | 1/2023 | Fagerland et al. | |
| 2023/0131214 A1 | 4/2023 | Gjerdevik et al. | |

FOREIGN PATENT DOCUMENTS

| | | | |
|---|---|---|---|
| CA | 3057309 C | 7/2023 | |
| CN | 1033604 A | 7/1989 | |
| CN | 201808937 U | 4/2011 | |
| CN | 102390701 A | 3/2012 | |
| CN | 205500186 U | 8/2016 | |
| CN | 105921419 A | 9/2016 | |
| CN | 106395225 A | 2/2017 | |
| CN | 108602630 A | 9/2018 | |
| CN | 110461734 A | 11/2019 | |
| CN | 114132676 A | 3/2022 | |
| DE | 957200 C | 1/1957 | |
| DE | 102004001181 A1 | 8/2005 | |
| DE | 102004013353 A1 | 10/2005 | |
| DE | 102005061309 A1 | 7/2007 | |
| DE | 102006057658 A1 | 6/2008 | |
| DE | 102007023909 A1 | 11/2008 | |
| DE | 102007038834 A1 | 2/2009 | |
| DE | 102008003157 A1 | 9/2009 | |
| DE | 102010002317 A1 | 8/2011 | |
| DE | 102012102333 A1 | 9/2013 | |
| DE | 102014111396 A1 | 2/2016 | |
| EP | 0235488 A1 | 9/1987 | |
| EP | 0613841 A1 | 9/1994 | |
| EP | 1695927 A2 | 8/2006 | |
| EP | 1995192 A2 | 11/2008 | |
| EP | 2233400 A1 | 9/2010 | |
| EP | 2650237 A1 | 10/2013 | |
| EP | 2823899 A1 | 1/2015 | |
| EP | 2937299 A1 | 10/2015 | |
| FR | 2832654 A1 | 5/2003 | |
| GB | 2084531 A | 4/1982 | |
| JP | S54131278 A | 10/1979 | |
| JP | S63310406 A | 12/1988 | |
| JP | 2007182286 A | 7/2007 | |
| JP | 2008037567 A | 2/2008 | |
| JP | 2009196818 A | 9/2009 | |
| JP | 2014141313 A | 8/2014 | |
| NL | 2650237 A1 * | 10/2013 | B65G 1/1378 |
| WO | 03095339 A1 | 11/2003 | |
| WO | 2005118436 A1 | 12/2005 | |
| WO | 2007009136 A1 | 1/2007 | |
| WO | 2008091733 A2 | 7/2008 | |
| WO | 2010017872 A1 | 2/2010 | |
| WO | 2010099873 A1 | 9/2010 | |
| WO | 2011038442 A2 | 4/2011 | |
| WO | 2012127102 A1 | 9/2012 | |
| WO | 2015035300 A1 | 3/2015 | |
| WO | 2015118171 A1 | 8/2015 | |
| WO | 2016100235 A1 | 6/2016 | |
| WO | 2016198565 A1 | 12/2016 | |
| WO | 2017036780 A1 | 3/2017 | |
| WO | 2017044747 A1 | 3/2017 | |
| WO | 2018175294 A1 | 9/2018 | |

OTHER PUBLICATIONS

Examiner's Report issued by the Innovation, Science and Economic Development Canada in related Canadian Patent Application No. 3,057,309 on Dec. 4, 2020, 4 pages.

Examiner's Report issued by the Innovatioon, Science and Economic Development Canada (Canadian Intellectual Property Office) in related Canadian Patent Application No. 3,057,309 on Feb. 4, 2022, 4 pages.

First Office Action issued by the China National Intellectual Property Administration, P.R.C. in related Chinese Patent Application No. 201880019640.3 on Sep. 3, 2020, 20 pages.

International Preliminary Report on Patentability issued by the International Bureau of WIPO in related International Application No. PCT/US2018/023093 on Sep. 24, 2019, 8 pages.

International Search Report and Written Opinion issued by the International Searching Authority in related International Application No. PCT/US2018/023093 on Jun. 21, 2018, 12 pages.

Non-Final Office Action issued by the U.S. Patent and Trademark Office in related U.S. Appl. No. 15/924,883 on Mar. 20, 2019, 26 pages.

Non-Final Office Action issued by the U.S. Patent and Trademark Office in related U.S. Appl. No. 16/744,862 on Nov. 24, 2021, 11 pages.

Second Office Action, along with its English translation, issued by the China National Intellectual Property Administration, P.R.C. in related Chinese Patent Application No. 201880019640.3 on Apr. 23, 2021, 23 pages.

First Office Action issued by the China National Intellectual Property Administration, P.R.C. in related Chinese Patent Application No. 202210058224.2 on Jun. 17, 2024, 33 pages.

\* cited by examiner

SYSTEMS AND METHODS FOR PROCESSING OBJECTS INCLUDING AN AUTO-SHUTTLE SYSTEM

PRIORITY

The present application is a continuation of U.S. patent application Ser. No. 17/739,735, filed May 9, 2022; which is a continuation of U.S. patent application Ser. No. 16/744,862, filed Jan. 16, 2020, now U.S. Pat. No. 11,365,051, issued Jun. 21, 2022; which is a continuation of U.S. patent application Ser. No. 15/924,883, filed Mar. 19, 2018, now U.S. Pat. No. 10,583,553, issued Mar. 10, 2020, which claims priority to U.S. Provisional Patent Application Ser. No. 62/473,843, filed Mar. 20, 2017, the disclosures of which are hereby incorporated by reference their entireties.

BACKGROUND

The invention generally relates to storage and retrieval systems, and relates in particular to automated storage and retrieval systems that are used with systems for processing objects.

Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The storage, retrieval and processing system includes a plurality of storage bins providing storage of a plurality of objects, where the plurality of storage bins is in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and a movable carriage for receiving the selected object from the end effector of the programmable motion device, and for carrying the selected object to one of a plurality of destination bins.

In accordance with another embodiment, the invention provides a storage, retrieval and processing system for processing objects, where the storage, retrieval and processing system includes a plurality of storage bins, at least one programmable motion device, and a movable carriage. The plurality of storage bins provides storage of a plurality of objects, and is provided in at least two linear arrangements, each of which is in communication with a retrieval conveyance system. The at least one programmable motion device is in communication with the retrieval conveyance system for receiving the storage bins from the plurality of bins, and the programmable motion device is for grasping and moving a selected object out of a selected storage bin. The reciprocating movable carriage is for receiving the selected object from the end effector of the programmable motion device, and for carrying the selected object to one of a plurality of destination bins that are provided in at least two linear arrangements of destination bins.

In accordance with a further embodiment, the invention provides a method of providing storage, retrieval and processing of objects. This includes the steps of providing a plurality of storage bins for storing a plurality of objects, the plurality of storage bins being in communication with a retrieval conveyance system, receiving the storage bins from the plurality of storage bins at a programmable motion device in communication with the retrieval conveyance system, grasping and moving a selected object out of a selected storage bin; receiving the selected object from the programmable motion device and carrying the selected object to one of a plurality of destination bins.

BRIEF DESCRIPTION OF THE DRAWINGS

The following description may be further understood with reference to the accompanying drawing in which.

The drawings are shown for illustrative purposes only.

DETAILED DESCRIPTION

In accordance with an embodiment, the invention provides a storage, retrieval and processing system for processing objects. The system includes a plurality of storage bins providing storage of a plurality of objects, a programmable motion device, and a movable carriage. The plurality of storage bins is in communication with a retrieval conveyance system. The programmable motion device is in communication with the retrieval conveyance system for receiving the storage bins from the plurality of bins, and the programmable motion device includes an end effector for grasping and moving a selected object out of a selected storage bin. The movable carriage receives the selected object from the end effector of the programmable motion device, and carries the selected object to one of a plurality of destination bins.

Figure 1:
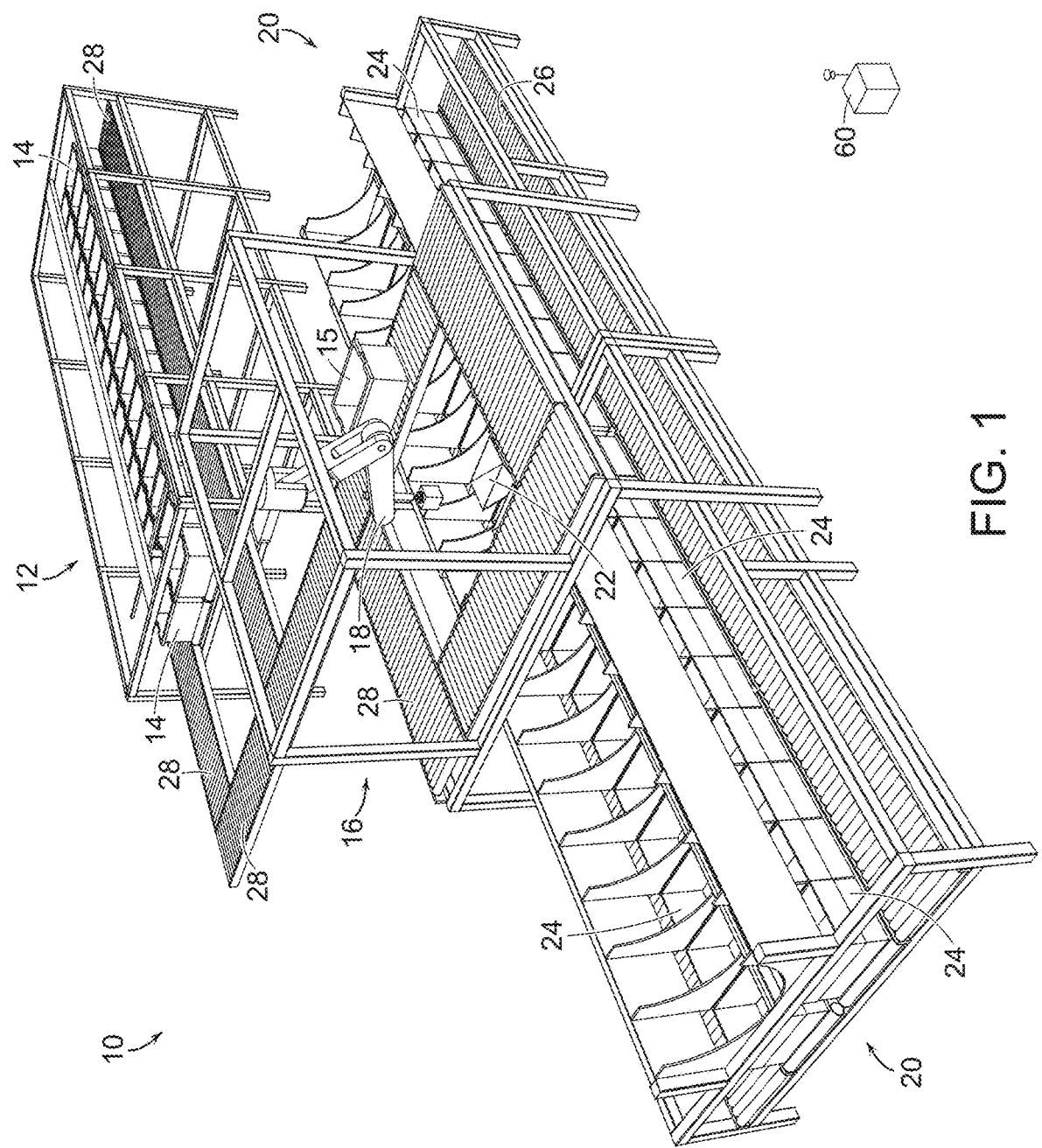
FIG. 1 shows an illustrative diagrammatic view of a storage, retrieval and processing system in accordance with an embodiment of the present invention.

With reference to FIG. 1, a system 10 in accordance with an embodiment of the present invention includes a storage section 12 at which a plurality of storage bins 14 are provided, a processing section 16 that includes a programmable motion device 18, and one or more destination section 20 that include one or more shuttle carriers 22. Generally, storage bins 14 are selectively provided to and from the processing section 16, where objects are moved from a selected storage bin and placed or dropped by the programmable motion device 18 into a carriage 22 of the destination section 20 for delivery to one of a plurality of destination bins 24. When a destination bin 24 is complete, the completed bin is urged onto an output conveyor 26 for further processing or transport.

Figure 2:
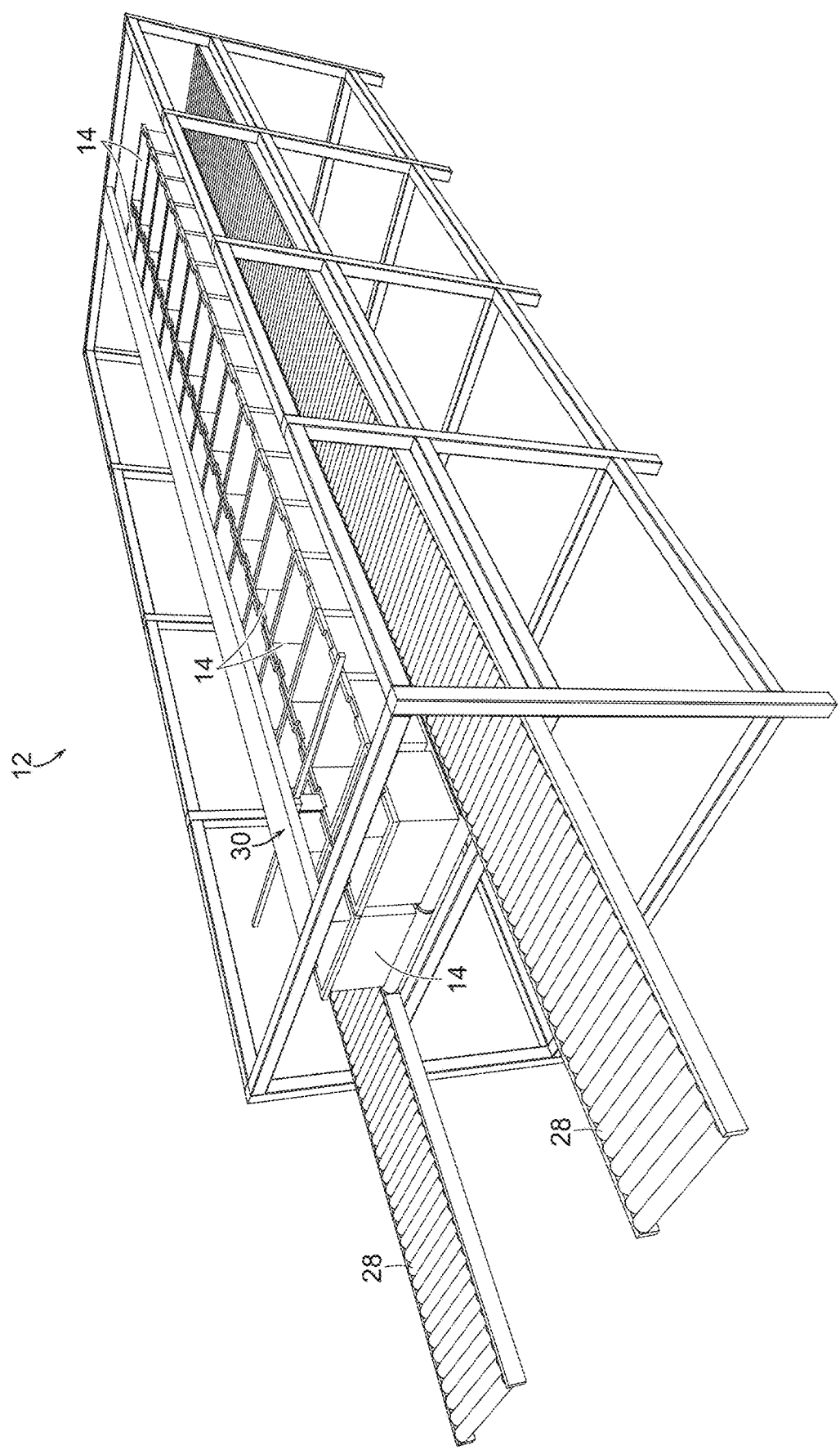
FIG. 2 shows an illustrative diagrammatic view of a storage section portion of the storage, retrieval and processing system of FIG. 1.
Figure 3A:
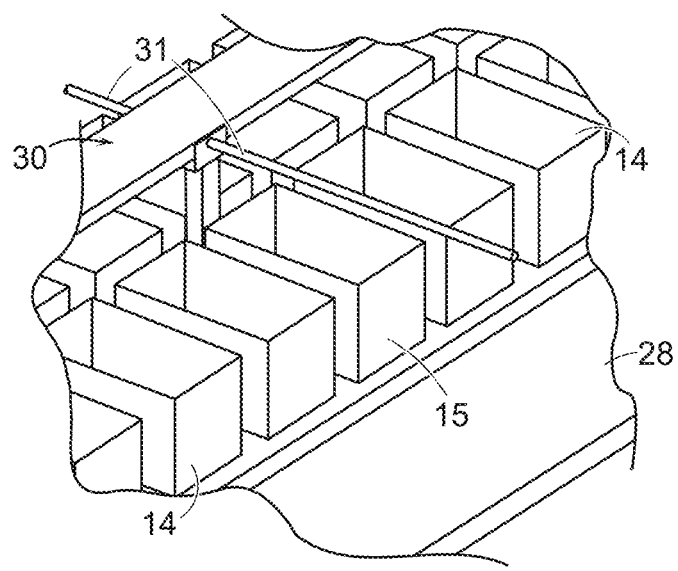
FIGS. 3A and 3B show illustrative diagrammatic views of embodiments of a bin displacement system for use in a retrieval conveyance system of the invention.

As shown in FIG. 2, the storage bins 14 of the storage section 12 are provided adjacent to retrieval conveyors 28 that carry a selected storage bin toward the processing station 16. As further shown with reference to FIGS. 3A and 3B, when a particular storage bin 15 is selected for retrieval, a bin removal mechanism 30 travels along between the bins 14, and stops adjacent to the selected storage bin as shown in FIG. 3A.

Figure 3B:
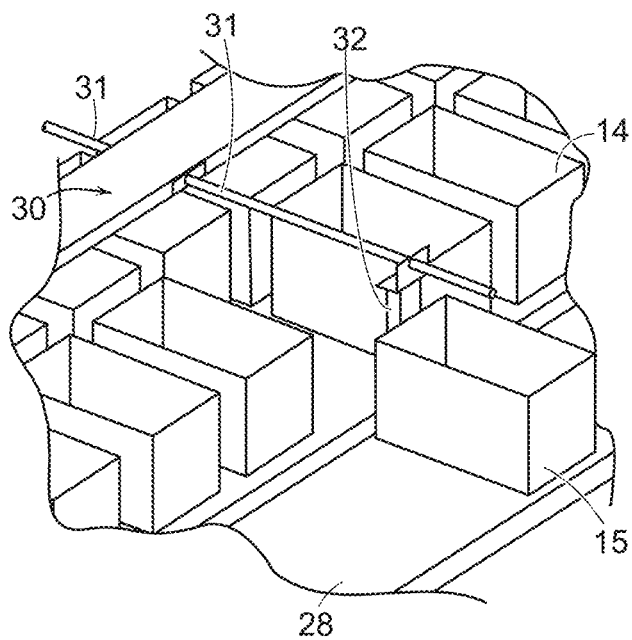

With reference to FIG. 3B, the system will then move an urging member 32 of the mechanism 30 to push the selected bin 15 onto a conveyor 28 leading to the processing section 16. The removal mechanism 30 may actuate the urging member 32 by any of a variety of processes, including having the support beam 31 be threaded with the urging member 28 being threaded onto the beam 29 such that it moves when the support beam is rotated, or by other mechanical, pneumatic or electronic actuation.

The conveyor 28 (as well as the other conveyors in the system) may be motion controlled so that both the speed and the direction of the conveyor (e.g., rollers or belt) may be controlled. In certain embodiments, certain of the conveyors (e.g., leading from the storage station 12 to the processing station 16) may be gravity biased to cause any storage bin on any conveyor system to be delivered to the processing section 16 near the programmable motion device 18.

The bins 14 may be provided as boxes, totes, containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 4:
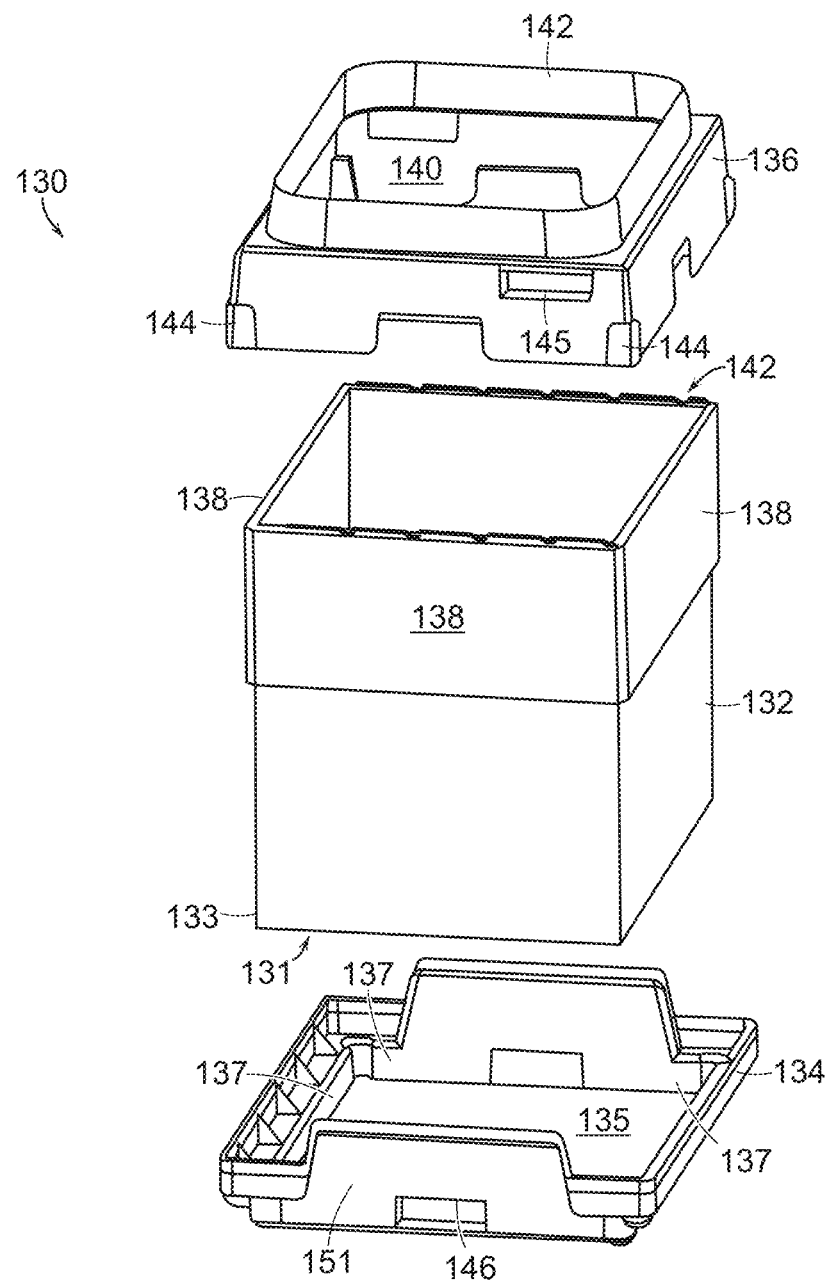
FIG. 4 shows an illustrative diagrammatic exploded view of a box assembly for use as a storage bin or destination bin in accordance with various embodiments of the present invention.

For example, FIG. 4 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 4, the box 132 may include top flaps 138 that, when opened as shown, are held open by inner surfaces 140 of the box cover 136. The box cover 136 may also include a recessed (protected) area in which a label or other identifying indicia 145 may be provided The box cover 136 also provides a defined rim opening 142, as well as corner elements 144 that may assist in providing structural integrity of the assembly, and may assist in stacking un-used covers on one another. Un-used box trays may also be stacked on each other.

Figure 5:
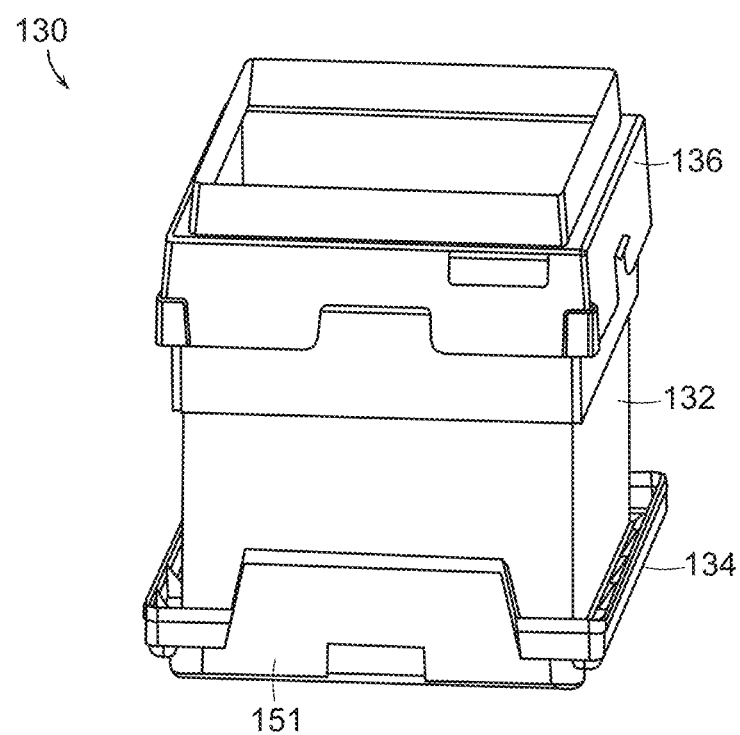
FIG. 5 shows the assembled box tray assembly of FIG. 4.

The box 132 is thus maintained securely within the box tray 134, and the box cover 136 provides that the flaps 138 remain down along the outside of the box permitting the interior of the box to be accessible through the opening 142 in the box cover 136. FIG. 5 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 6A:
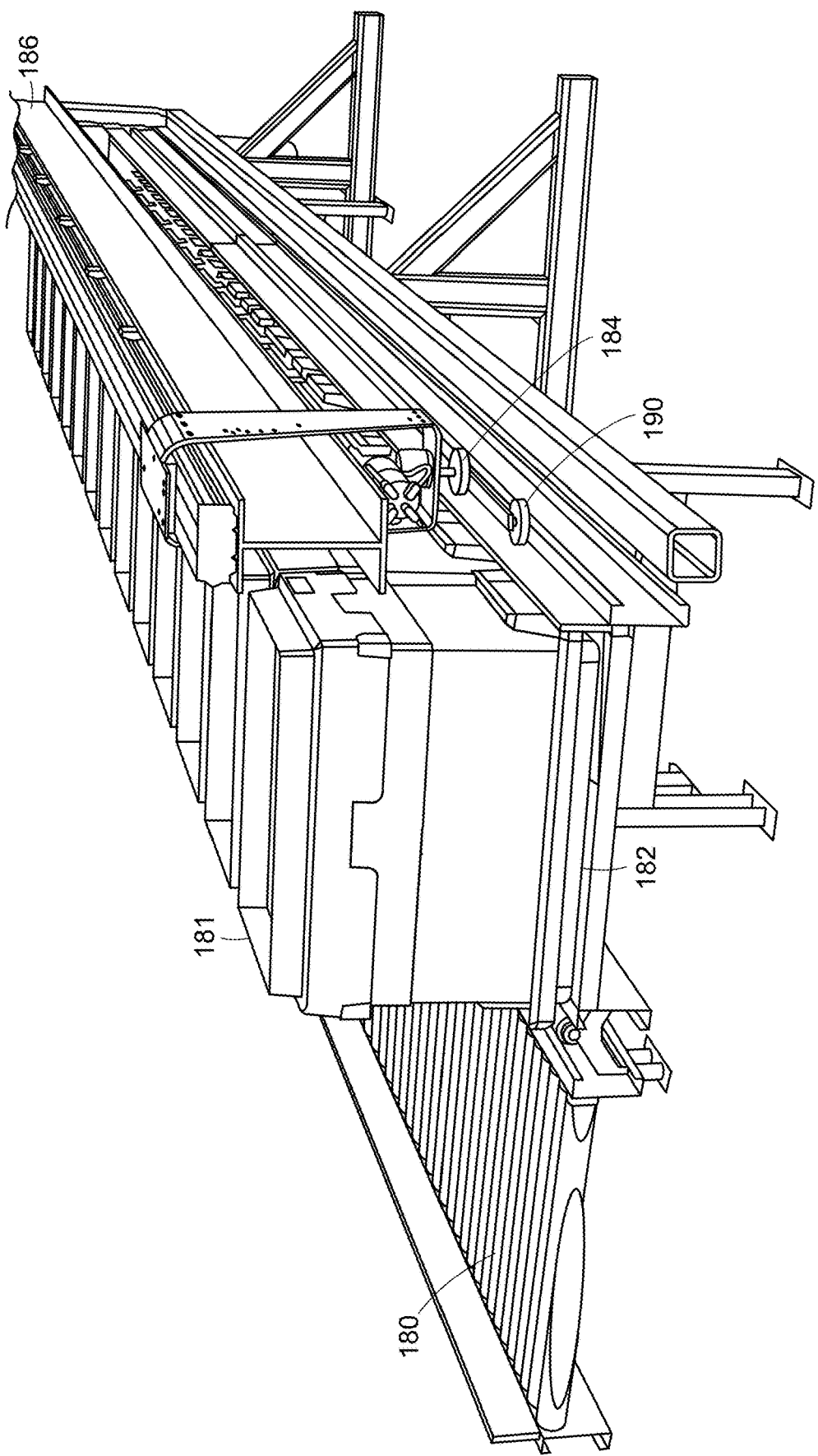
FIG. 6A-6D show illustrative diagrammatic views of a further embodiment of a bin displacement system for use in further embodiments of the invention.
Figure 6B:
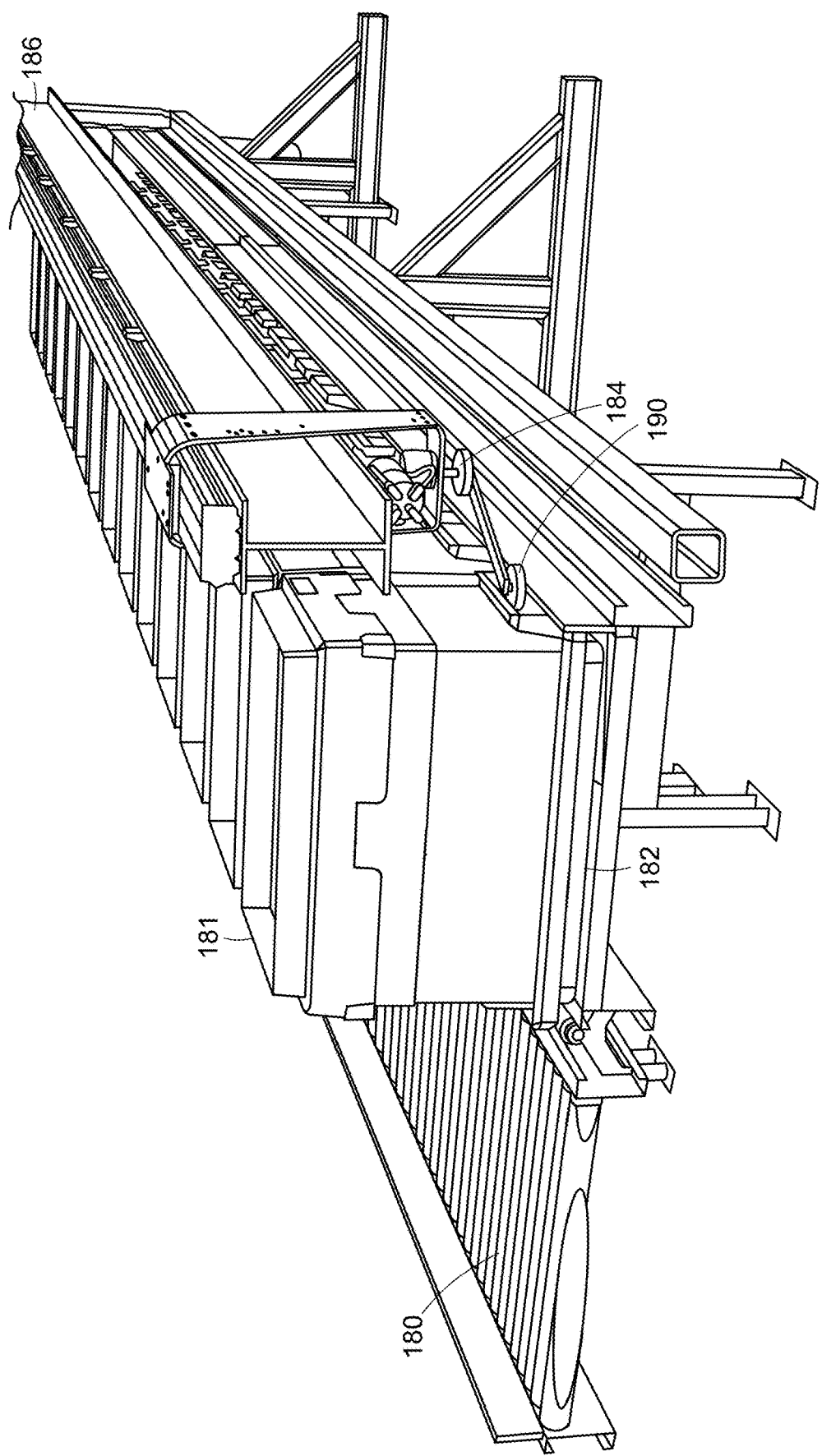
Figure 6C:
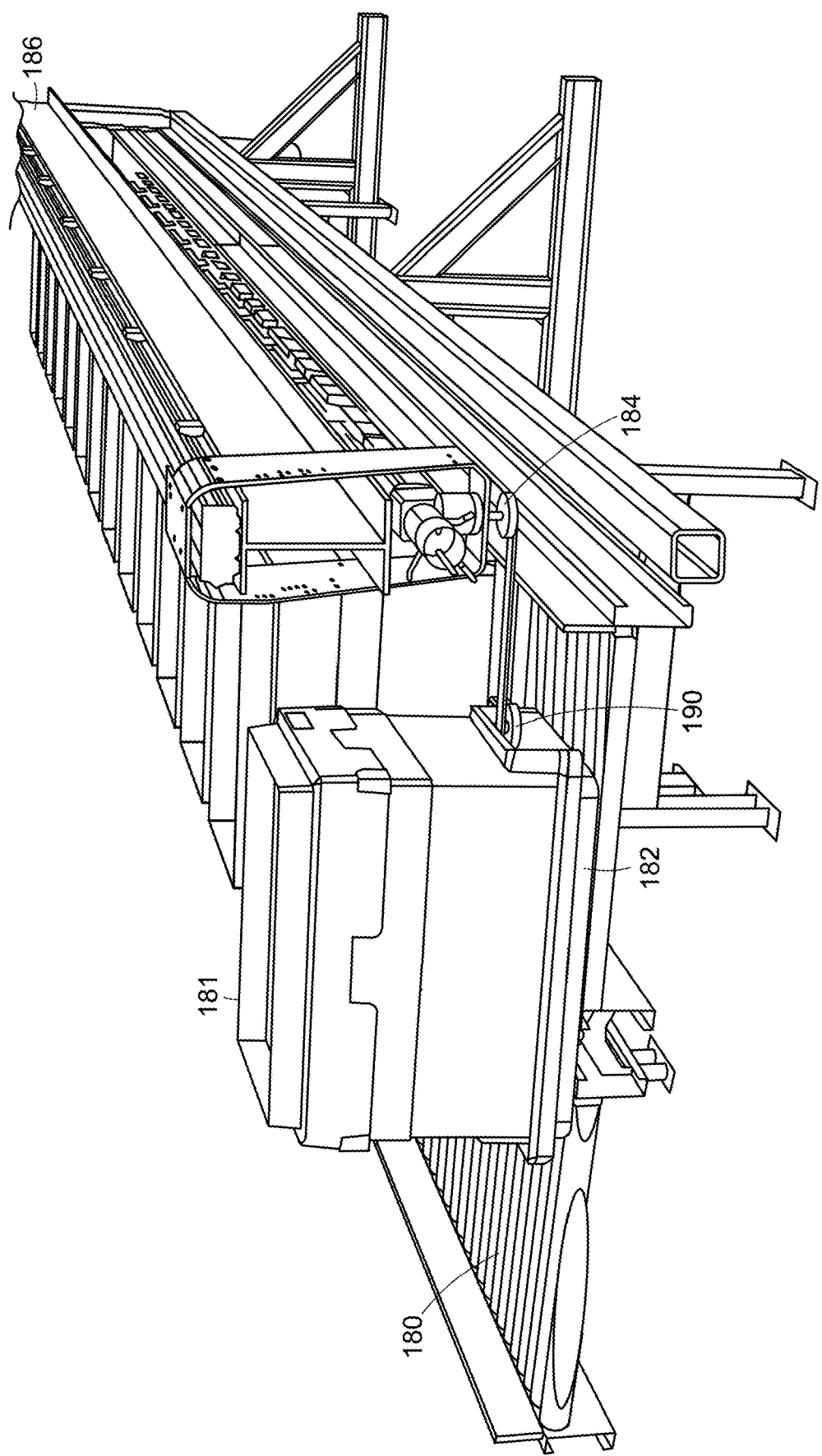
Figure 6D:
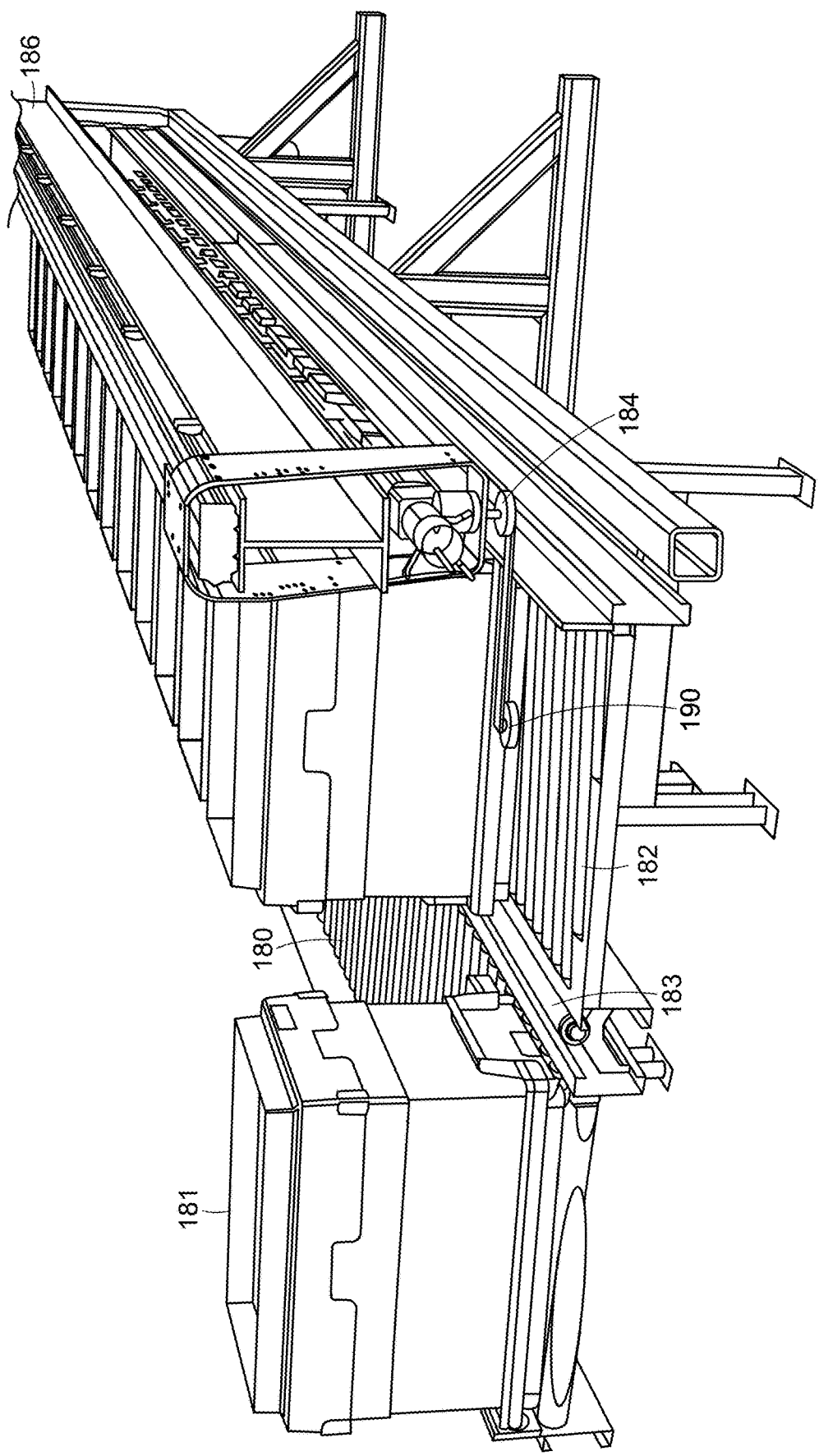

With reference to FIGS. 6A-6D, a box kicker 184 in accordance with an embodiment of the present invention may be suspended by and travel along a track 86, and may include a rotatable arm 88 and a roller wheel 190 at the end of the arm 88. With reference to FIGS. 6B-6D, when the roller wheel 190 contacts the kicker plate 151 (shown in FIG. 4) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181, e.g., by being activated to pull the box tray over to the conveyor 180.

Figure 7:
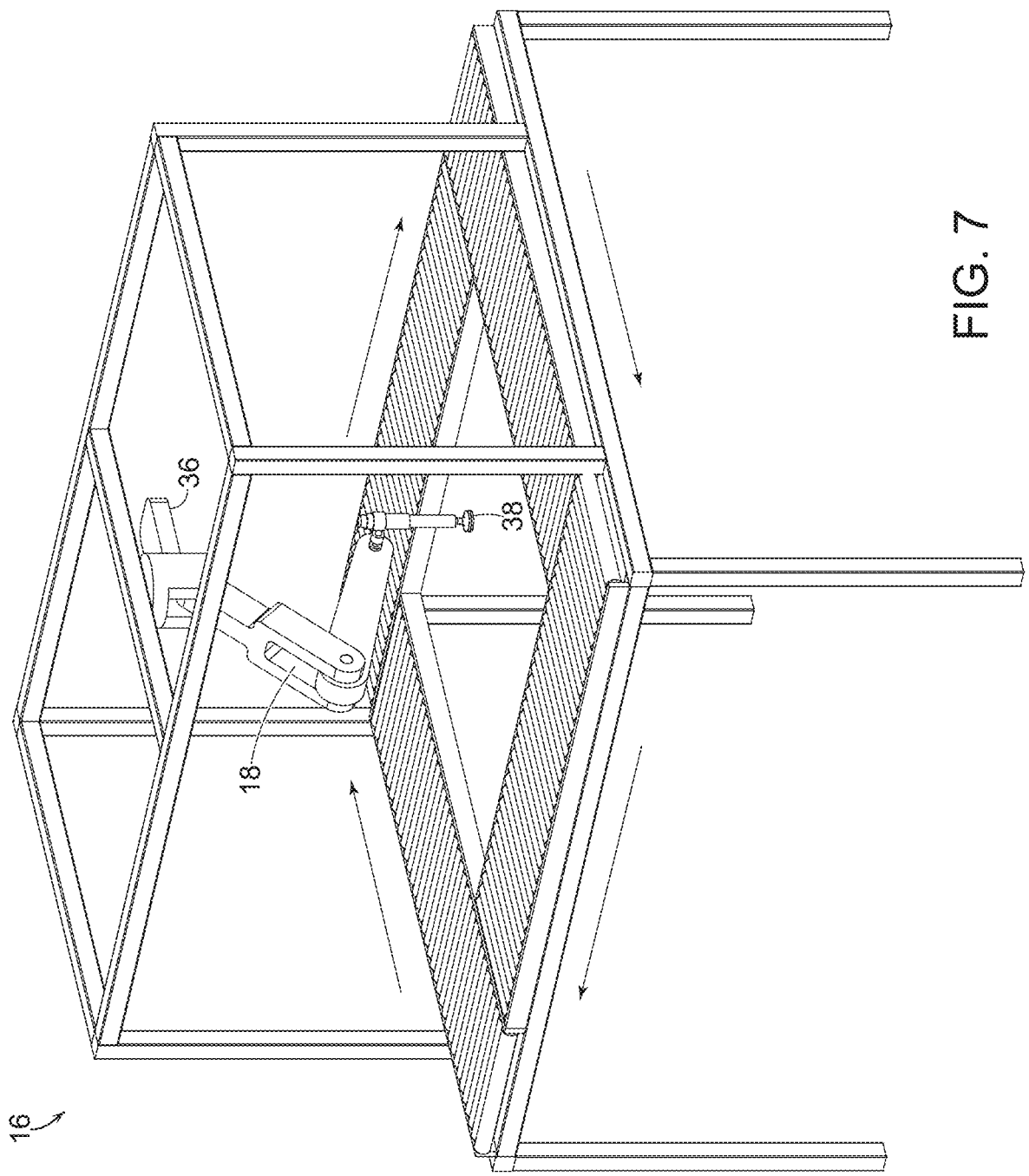
FIG. 7 shows an illustrative diagrammatic view of a programmable motion device processing station for use in a storage, retrieval and processing system in accordance with an embodiment of the present invention.

With reference to FIG. 7, the processing station 16 also includes a perception unit 36 that is mounted adjacent to the base of the programmable motion device 18, and looks down into the selected storage bin. An end effector 38 of the programmable motion device grasps an object in bin, and moves to deliver the object to a desired destination bin 24 by placing or dropping the object into a carriage, that then shuttles the object to the selected destination bin 24 (as shown further in FIG. 12).

The storage bin may then be returned to the plurality of storage bins at the storage station, and may be returned anywhere among the bins as long as the system knows where the bin has been returned, and knows how each of the bins may have been moved when the selected storage bin was transferred to the conveyor 28. The storage bins, for example, may be biased (e.g., by gravity) to stack against one of the ends of each row of bins, and the returned bins may be put at the uphill end of a row of storage bins. The storage bins may be returned to the storage section 12 by the conveyors as discussed above, and may be returned to the central area between the conveyors 28 either by human personnel or by employing additional removal mechanisms as discussed above to urge bins back into the central area.

Figure 8:
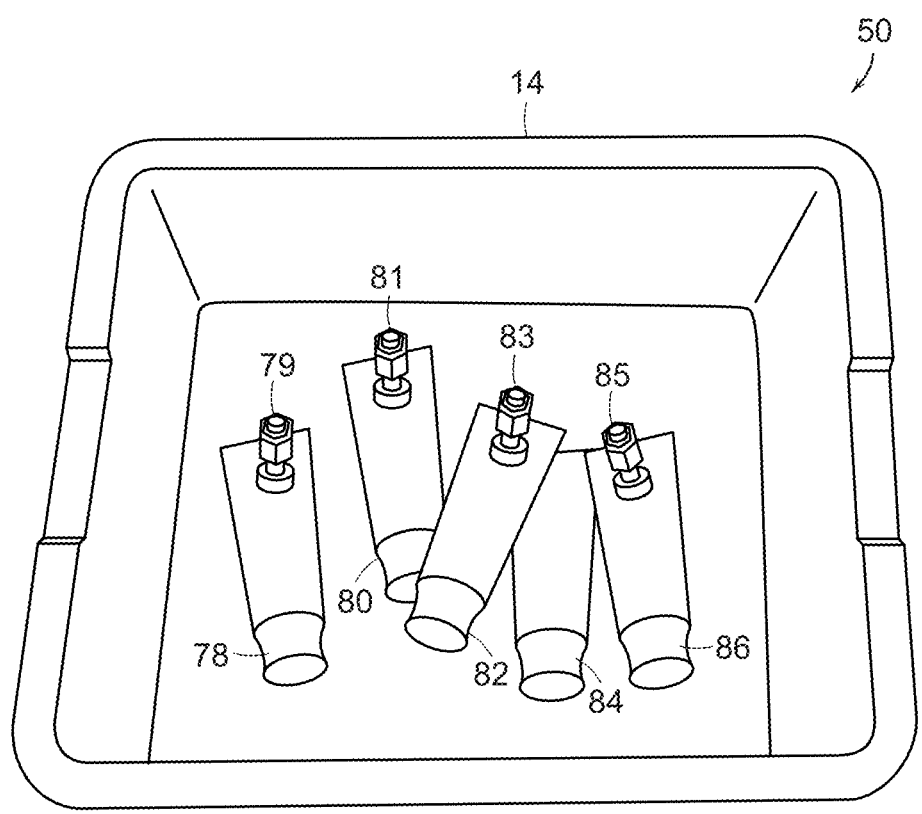
FIG. 8 shows an illustrative diagrammatic view from the perception system of FIG. 7, showing a view of objects within a bin of objects to be processed.

FIG. 8 shows an image view 50 of a bin 14 from the perception unit 38. The image view shows the bin 14 (e.g., on the conveyor), and the bin 14 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 5. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 9A:
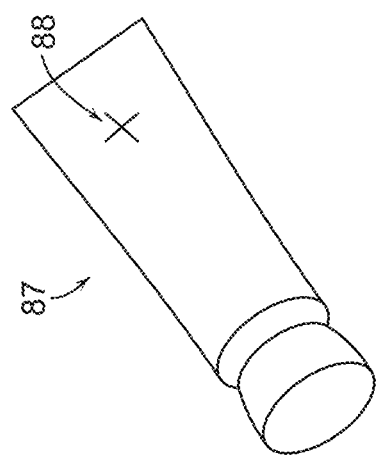
FIGS. 9A and 9B show illustrative diagrammatic views of a grasp selection process in a storage, retrieval and processing system of the embodiment of the present invention.
Figure 9B:
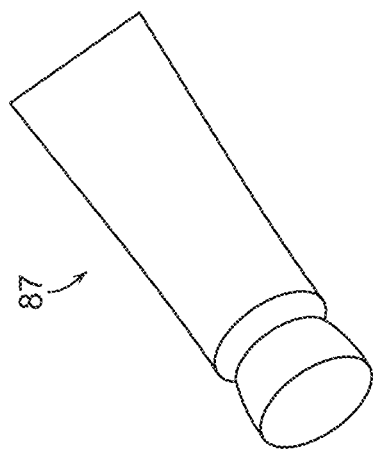

As shown in FIGS. 9A and 9B, the perception system may also identify portions of an object that are the most flat in the generation of good grasp location information. In particular, if an object includes a tubular end and a flat end such as object 87, the system would identify the more flat end as shown at 88 in FIG. 9B. Additionally, the system may select the area of an object where a UPC code appears, as such codes are often printed on a relatively flat portion of the object to facilitate scanning of the barcode.

Figure 10A:
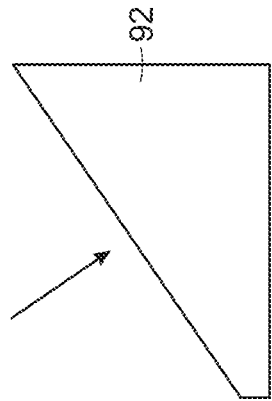
FIGS. 10A and 10B show illustrative diagrammatic views of a grasp planning process in a storage, retrieval and processing system of the embodiment of the present invention.
Figure 10B:
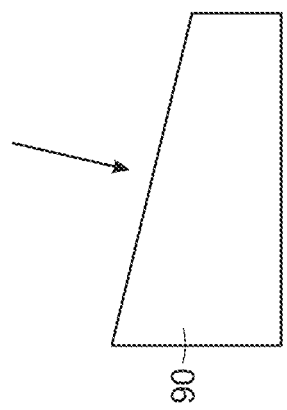
Figure 11A:
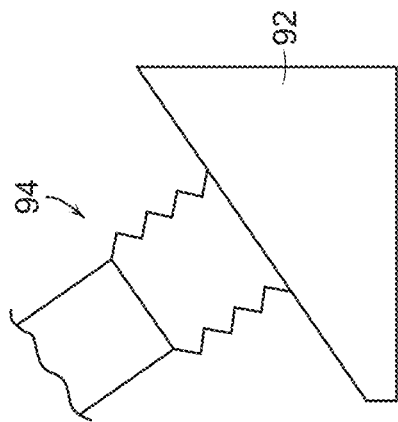
FIGS. 11A and 11B show illustrative diagrammatic views of a grasp execution process in a storage, retrieval and processing system of the embodiment of the present invention.
Figure 11B:
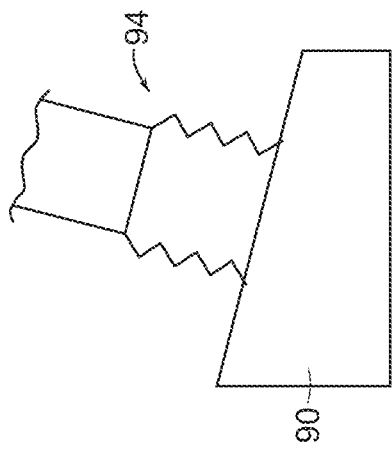

FIGS. 10A and 10B show that for each object 90, 92, the grasp selection system may determine a direction that is normal to the selected flat portion of the object 90, 92. As shown in FIGS. 11A and 11B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention therefore provides in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

Figure 12:
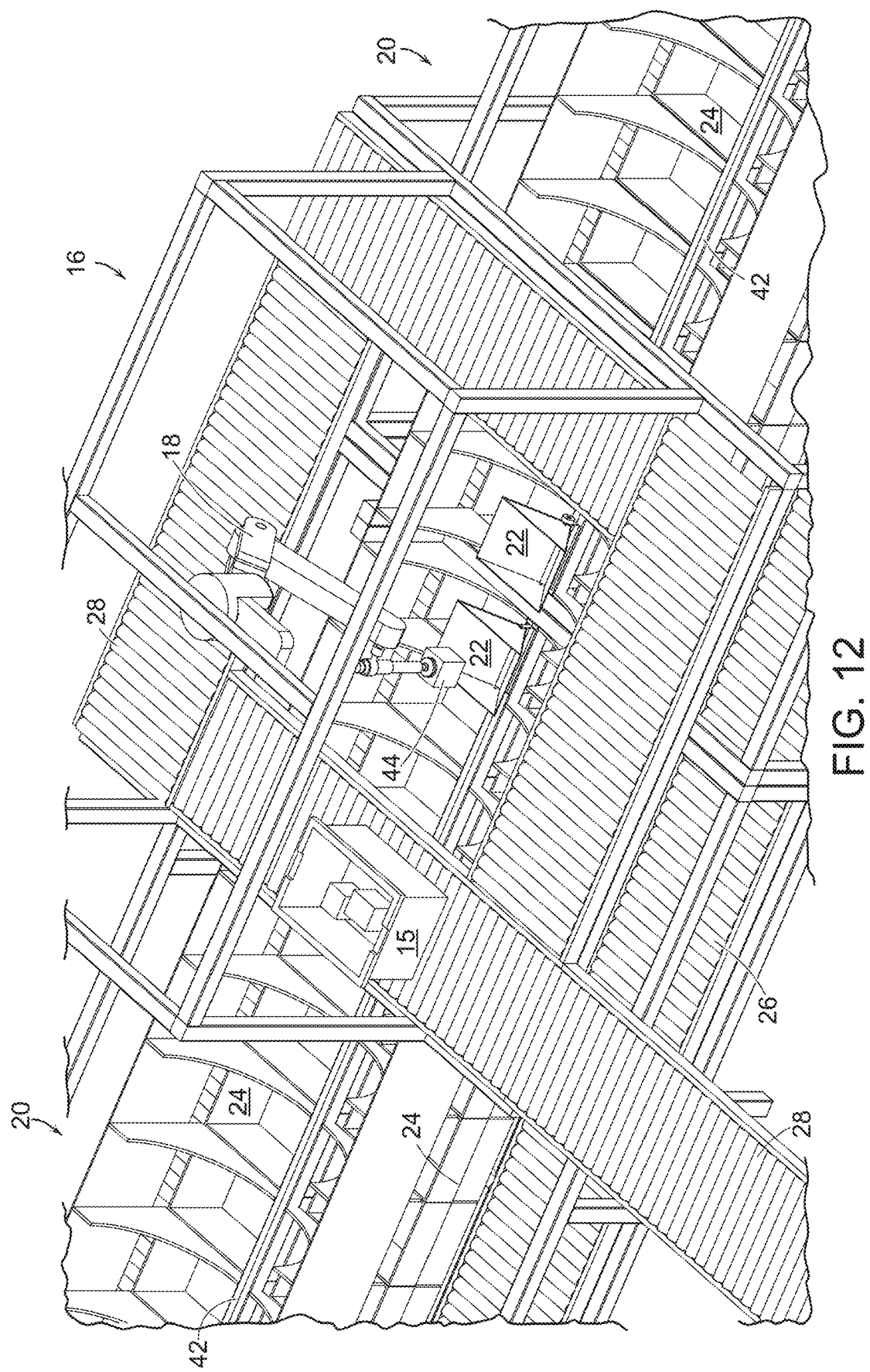
FIG. 12 shows an illustrative diagrammatic view of a portion of the processing system together with a portion of a destination section of an embodiment of a storage, retrieval and processing system in accordance with an embodiment of the invention.
Figure 14:
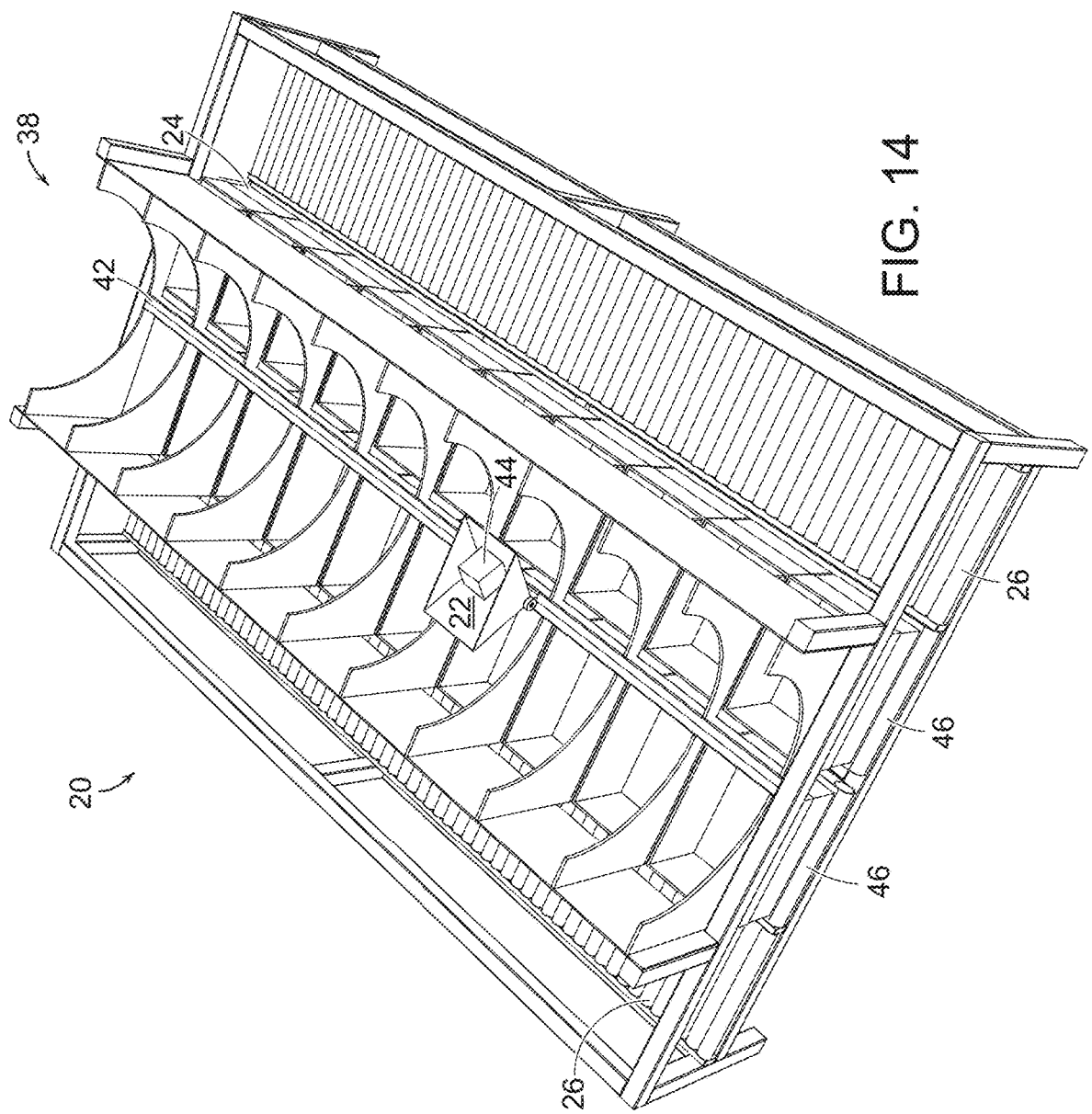
FIG. 14 shows an illustrative diagrammatic view of the processing section of FIG. 13 with the carriage having been moved along its track.
Figure 15:
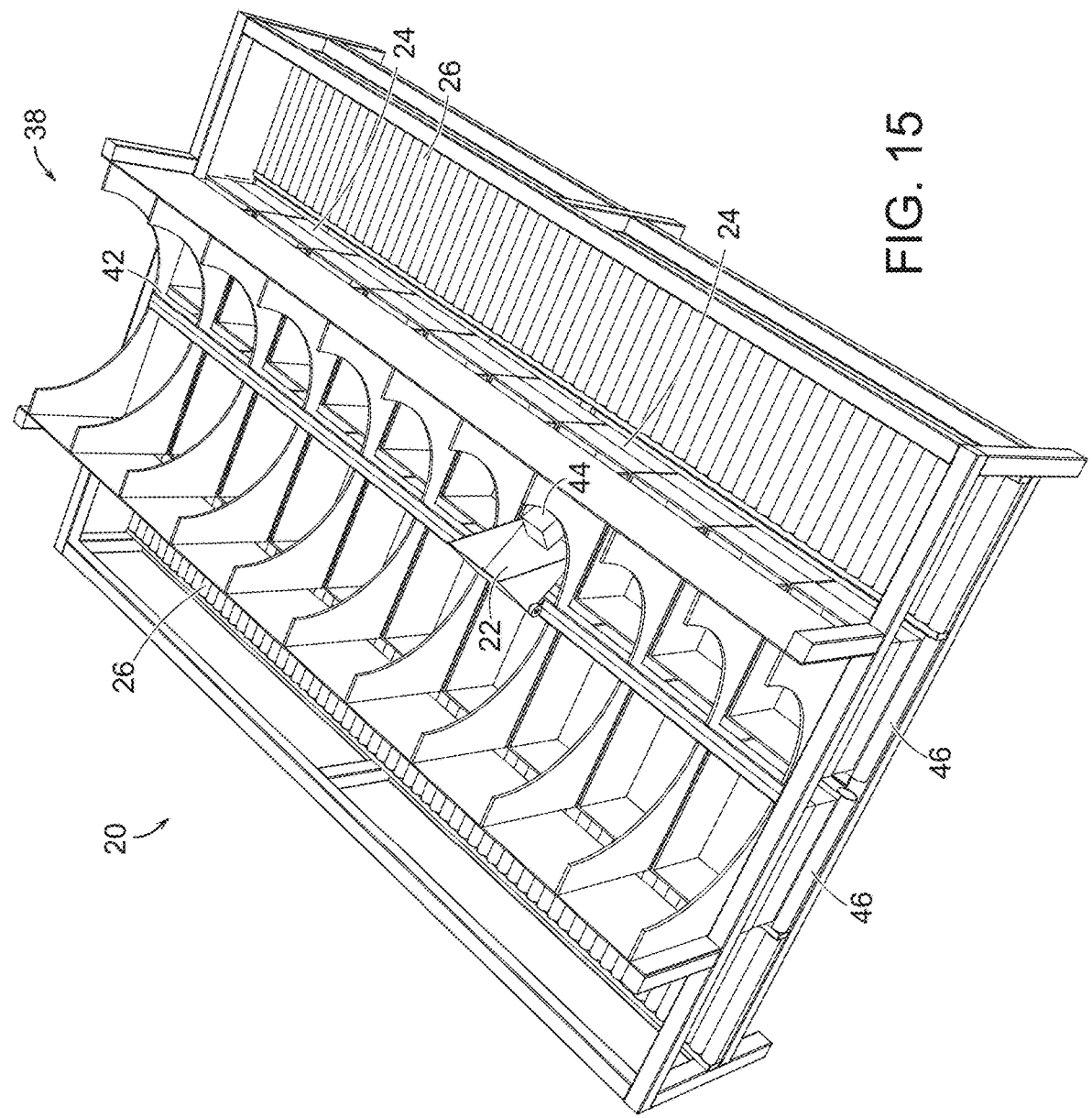
FIG. 15 shows an illustrative diagrammatic view of the processing section of FIG. 13 with the carriage having transferred its load to a destination bin.

FIG. 12 shows the processing section 16 and portions of the destination sections 20 of the system, which include movable carriages 22 that may receive an object from the end effector 38 of the programmable motion device 18. The movable carriage is reciprocally movable between the destination bins 24, and as further shown in FIGS. 13 and 14, each carriage 22 moves along a track 42, and may be actuated to drop an object 44 into a desired destination bin 24 (as shown in FIG. 15).

Figure 16A:
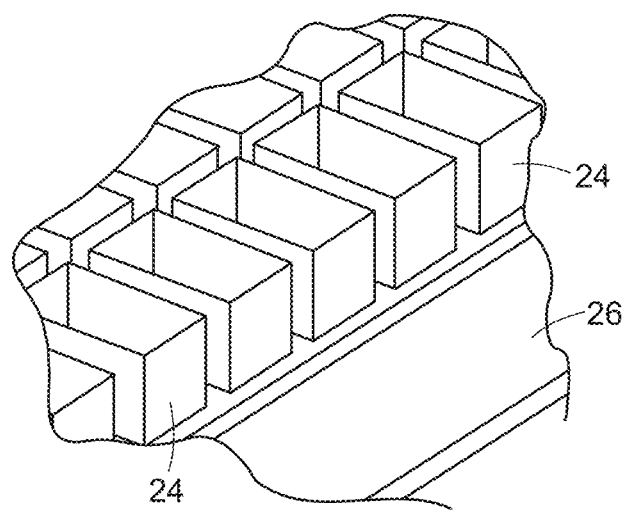
FIGS. 16A and 16B show illustrative diagrammatic views of a bin removal mechanism for use in a storage, retrieval and processing system in accordance with an embodiment of the invention.
Figure 16B:
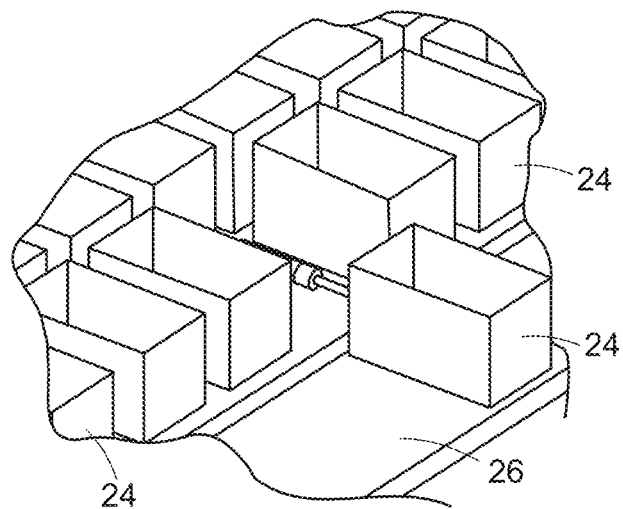

The destination bins may be provided in a conveyor (e.g., rollers or belt), and may be biased (for example by gravity) to urge all destination bins toward one end (for example, the distal end 38 as shown). With reference to FIGS. 16A and 16B, when a destination bin 24 is selected for removal (e.g., because the bin is full or otherwise ready for further processing), the system will urge the completed bin onto an output conveyor 26 to be brought to a further processing or shipment station. The conveyor 26 may be biased (e.g., by gravity) to cause any bin on the conveyor to be brought to an output location.

FIGS. 16A and 16B show a bin being urged from the plurality of destination bins, onto the output conveyor 26 by the use of a displacement mechanism 48. In accordance with further embodiments, other displacement mechanisms may be used, including for example, those discussed above with reference to FIGS. 3A-3B, and 6A-6D. The destination bins may be provided as boxes or containers or any other type of device that may receive and hold an item, including the box tray assemblies discussed above with reference to FIGS. 4 and 5.

Figure 13:
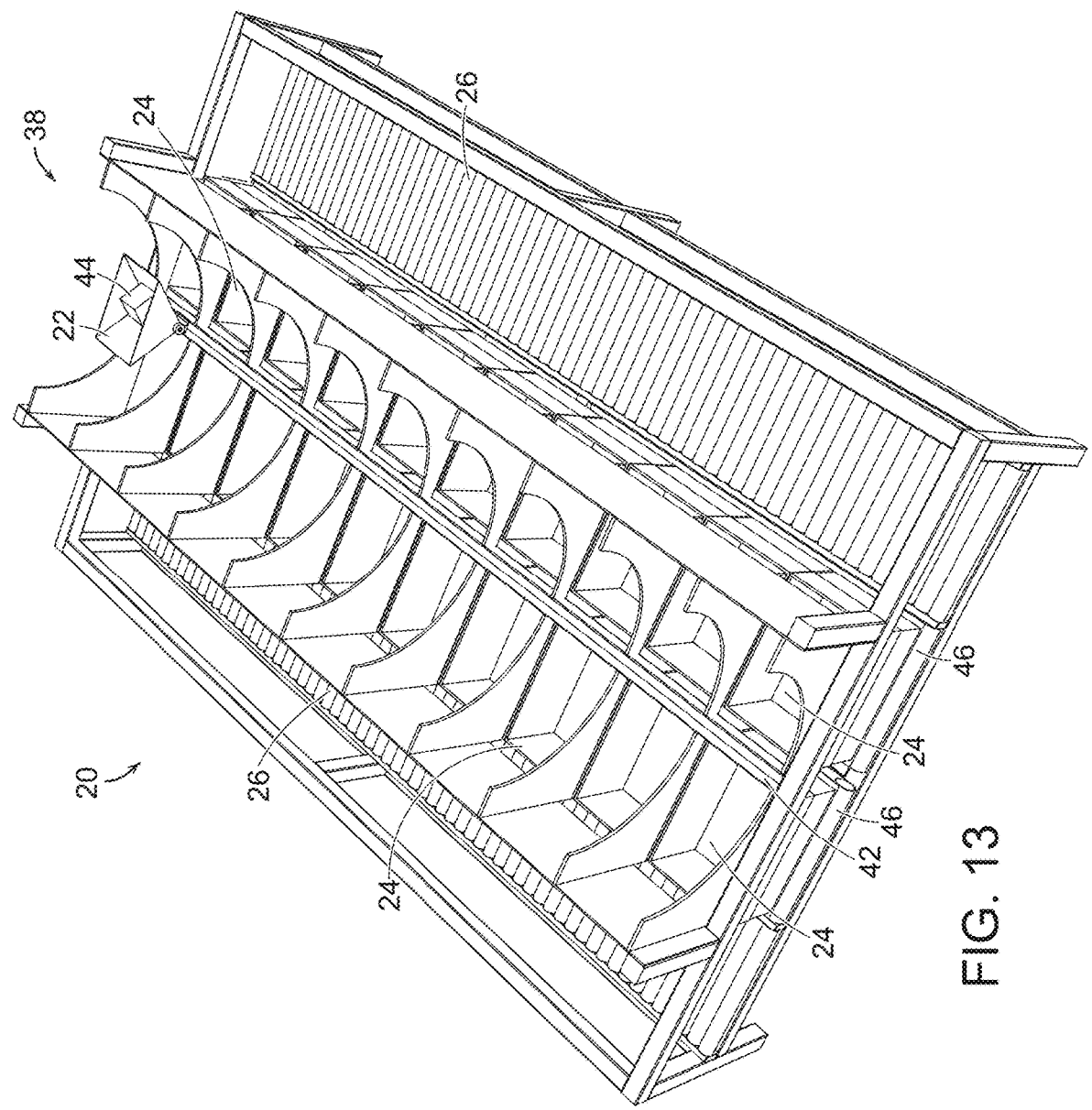
FIG. 13 shows an illustrative diagrammatic view of a processing section in a storage, retrieval and processing system in accordance with an embodiment of the invention wherein an object is placed in a carriage.
Figure 17:
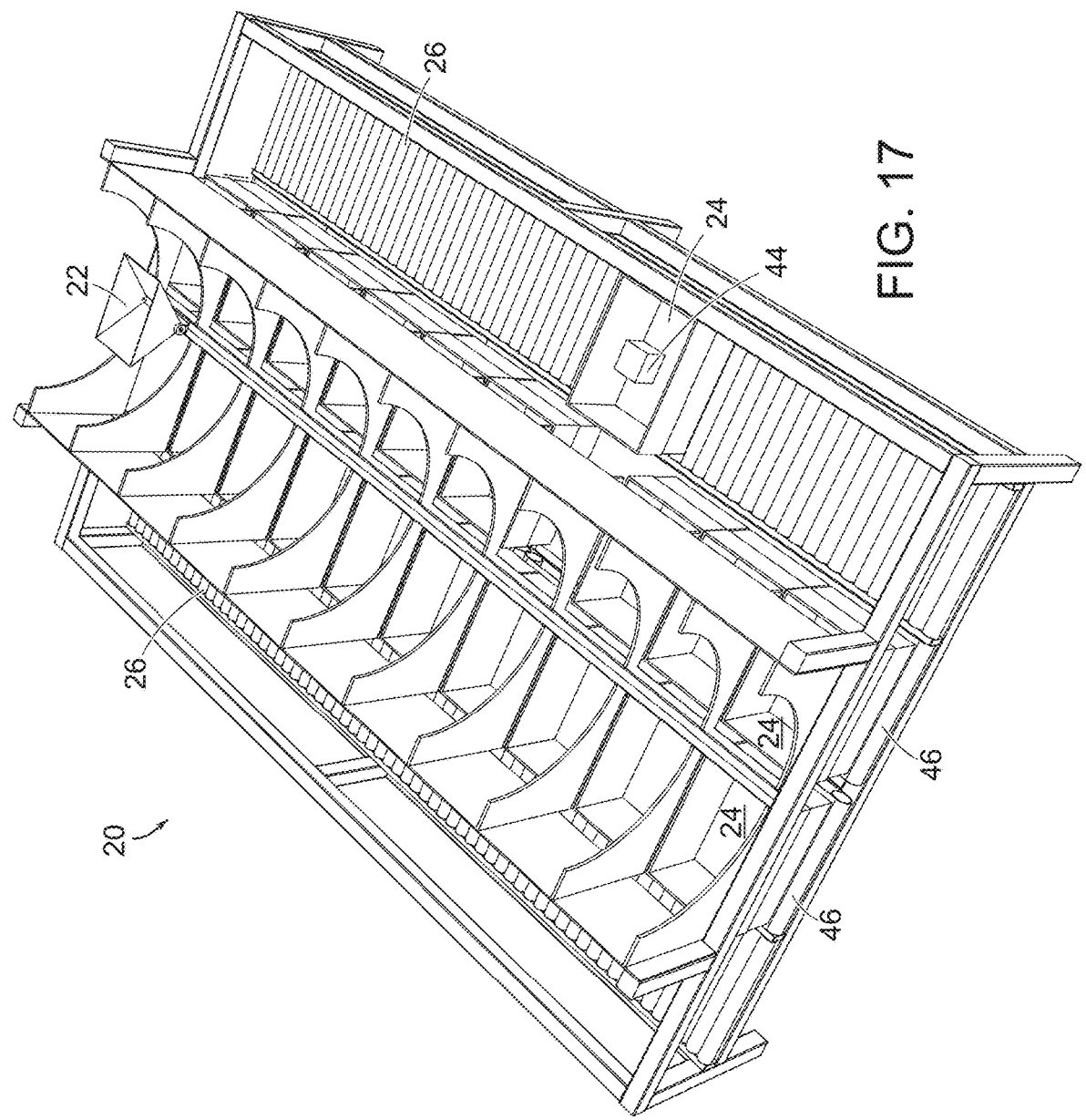
FIG. 17 shows an illustrative diagrammatic view of the processing section of FIG. 13 with the carriage having returned to its base, and a removed destination bin being moved urged from its location.
Figure 18:
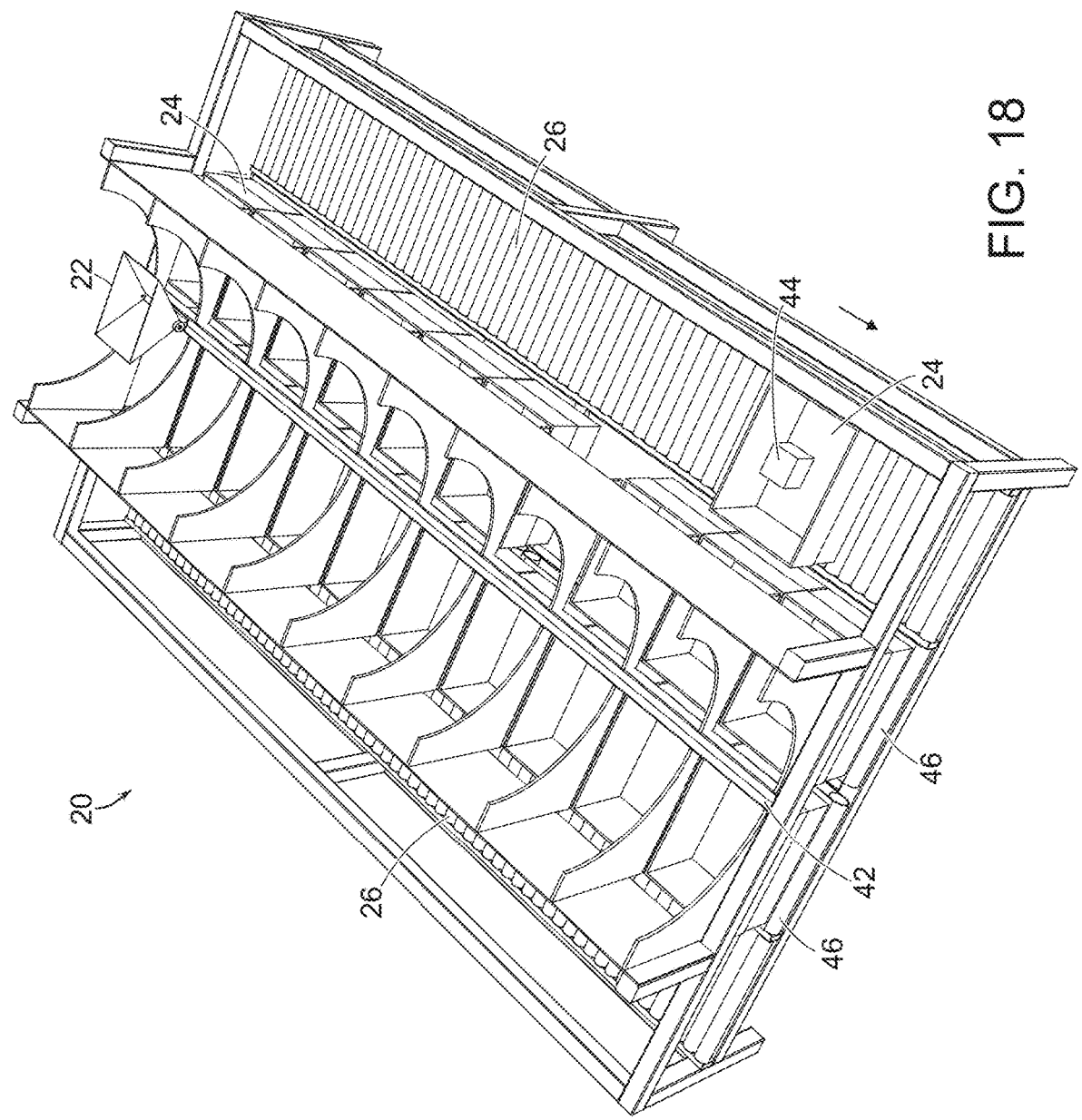
FIG. 18 shows an illustrative diagrammatic view of the processing section of FIG. 13 with the removed destination bin being moved along an output conveyor.

Following displacement of the bin onto the conveyor (as shown in FIG. 17), each of the destination bins may be urged together, and the system will record the change in position of any of the bins that moved (as shown in FIG. 18). This way, a new empty bin may be added to the end, and the system will record the correct location and identified processing particulars of each of the destination bins. This is shown in FIGS. 13 and 14, whereby a bin 24 is removed and pushed onto the conveyor 26 (see FIG. 13), and then the remaining bins are urged together while the removed bin rolls toward an output location (see FIG. 14).

Figure 19:
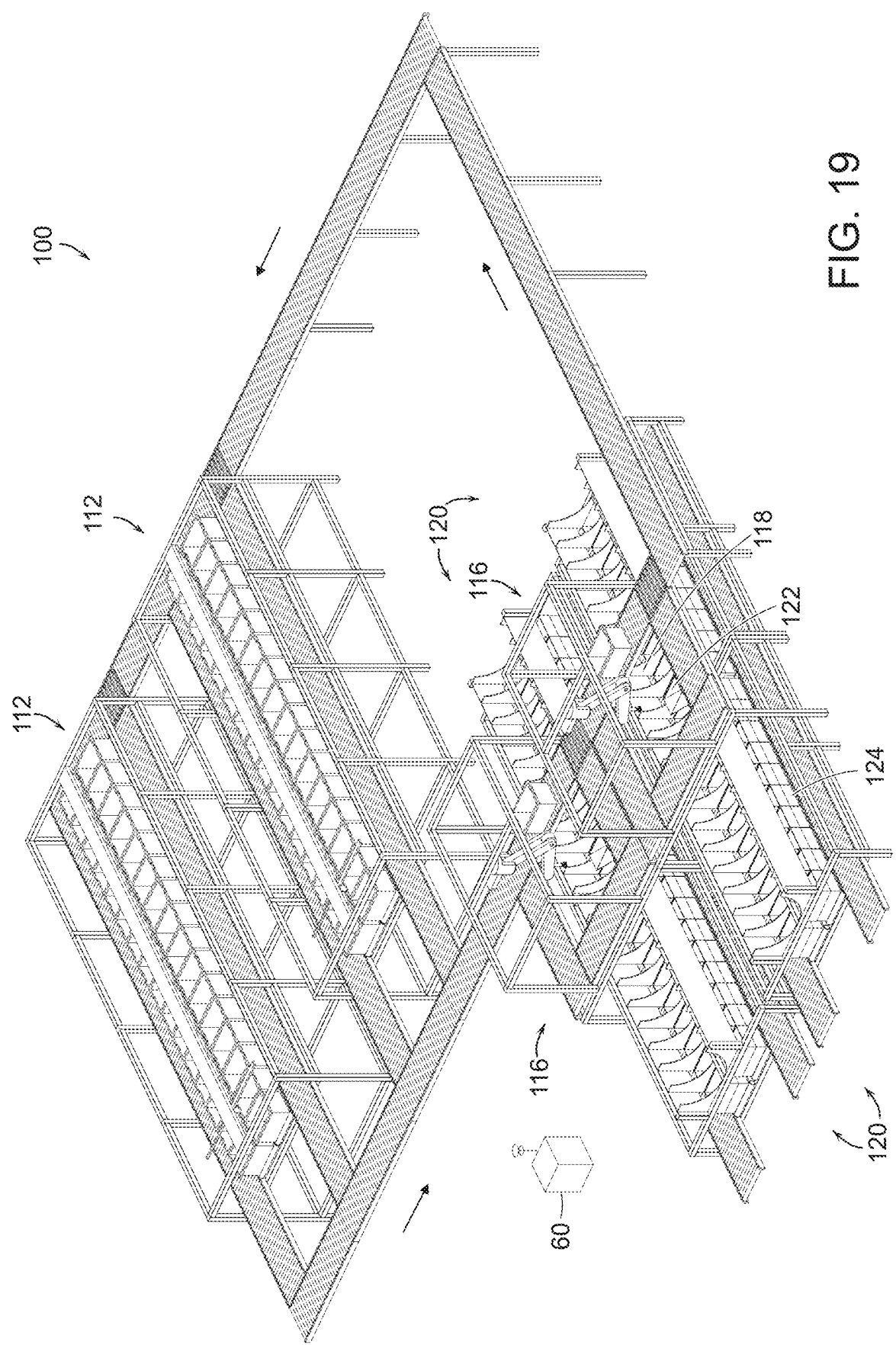
FIG. 19 shows an illustrative diagrammatic view of a storage, retrieval and processing system in accordance with a further embodiment of the present invention employing a plurality of storage sections, processing sections, and a plurality of destination sections.

Systems of the invention are highly scalable in terms of sorts-per-hour as well as the number of storage bins and destination bins that may be available. FIG. 19 shows a system 100 in accordance with a further embodiment of the present invention that includes plurality of storage sections 112, a plurality of processing sections 116, and a plurality of destination sections 120. Generally, both storage sections 112 function as discussed above with regard to FIGS. 1-6D and feed both processing sections 116 as discussed above with reference to FIGS. 1 and 4. Each processing section 116 includes a programmable motion device 118 that provides objects to carriages of one or more processing sections 120.

Figure 20:
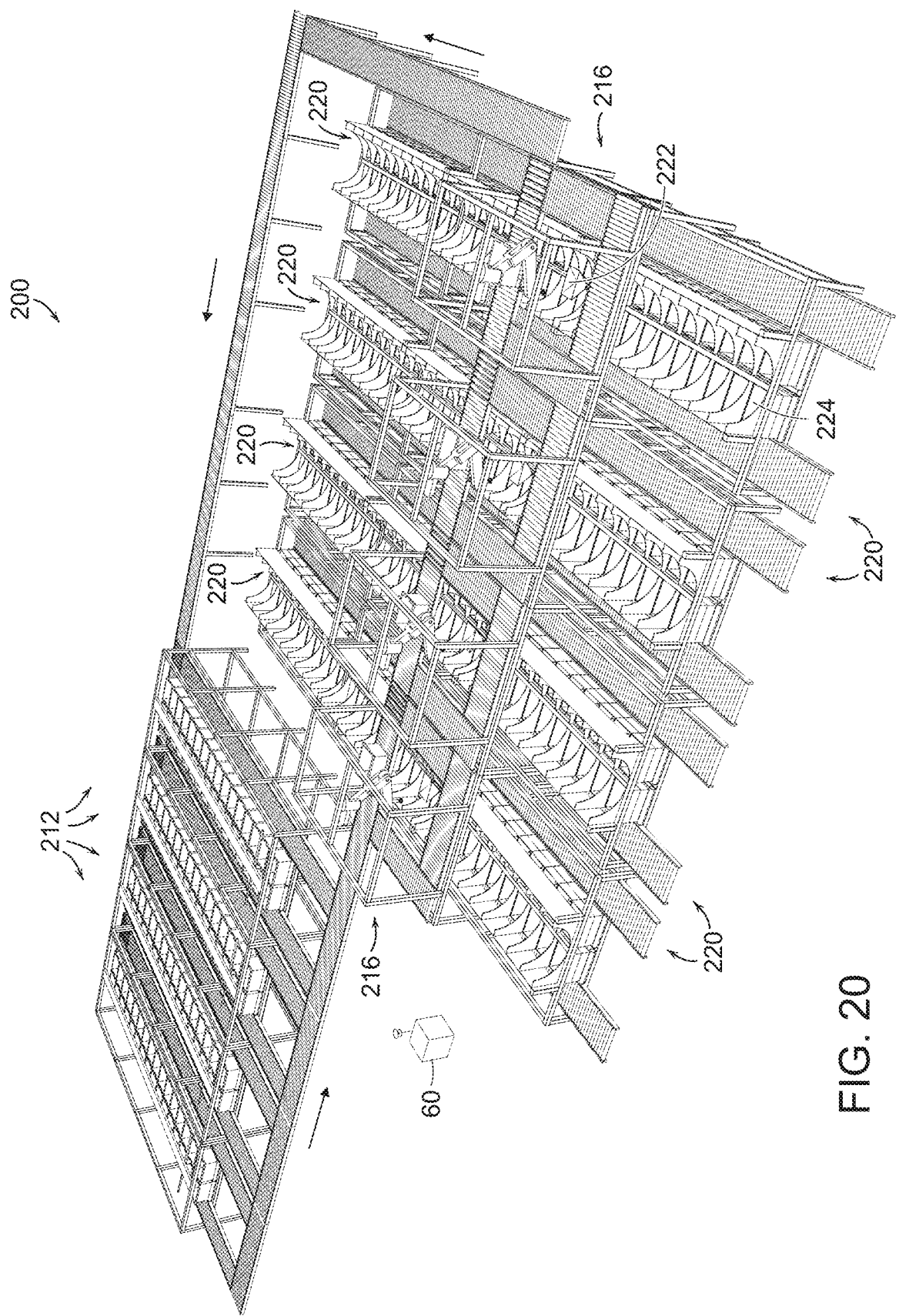
FIG. 20 shows an illustrative diagrammatic view of a storage, retrieval and processing system in accordance with a further embodiment of the present invention employing further pluralities of storage sections, processing sections and destination sections.

FIG. 20 shows a system 200 in accordance with a further embodiment of the present invention that includes a further plurality (e.g., four) of storage sections 212, a further plurality (e.g., four) of processing sections 216, and a further plurality (e.g., four pairs) of destination sections 120. Generally, all storage sections 212 function as discussed above with regard to FIGS. 1-3B and feed all processing sections 216 as discussed above with reference to FIGS. 1 and 4. Each processing section 216 includes a programmable motion device 218 that provides objects to carriages of one or more processing sections 220.

Control of each of the systems 10, 100 and 200 may be provided by the computer system 60 that is in communication with the storage conveyors and displacement mechanism(s), the processing conveyors and displacement mechanism(s), and the programmable motion device(s). The computer system 60 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modifications and variations may be made to the above disclosed embodiments without departing from the spirit and scope of the present invention.

What is claimed is:

1. An automated storage, retrieval and processing system comprising:
   an input bin storage section that includes a plurality of input bins for access by a retrieval conveyance system that brings an input bin of the plurality of input bins to a processing station;
   a receiving area at the processing station for receiving the input bin containing one or more objects, the processing station including a programmable motion device for grasping and removing a selected object of the one or more objects from the input bin and moving and dropping the selected object;
   a carrier for receiving the dropped selected object from the programmable motion device, said carrier being adapted to move the selected object as well as being adapted to discharge the selected object from the carrier; and
   an array of destination locations below the carrier such that the carrier is movable at an elevation above the array of destination locations, each destination location including an open top such that the carrier deposits the selected object into a selected destination location of the plurality of destination locations by discharging the selected object into the open top of the selected destination location.

2. The automated storage, retrieval and processing system as claimed in claim 1, wherein the programmable motion device includes an articulated arm with a vacuum end-effector.

3. The automated storage, retrieval and processing as claimed in claim 1, wherein the array of destination locations is provided as at least one pair of rows of destination locations.

4. The automated storage, retrieval and processing system as claimed in claim 1, wherein each destination location is adapted for sealing and shipment for transport.

5. The automated storage, retrieval and processing system as claimed in claim 1, wherein each destination location is provided adjacent an output conveyance system for receiving completed destination containers.

6. The automated storage, retrieval and processing system as claimed in claim 5, further comprising an output bin displacement system for displacing the completed destination containers onto the output conveyance system.

7. The automated storage, retrieval and processing system as claimed in claim 1, wherein the retrieval conveyance system includes an infeed conveyor section that brings any of the plurality of input bins to the processing station.

8. The automated storage, retrieval and processing system as claimed in claim 7, wherein the infeed conveyor section is gravity biased toward the processing station.

9. The automated storage, retrieval and processing system as claimed in claim 8, wherein the retrieval conveyance system includes a bin displacement system for displacing the input bin onto the infeed conveyor section.

10. The automated storage, retrieval and processing system as claimed in claim 9, wherein the retrieval conveyance system includes a return conveyor section that returns any of the input bins to the input bin storage section.

11. An automated storage, retrieval and processing system for processing objects, the automated storage, retrieval and processing system comprising:

an input bin storage section that includes a plurality of input bins for access by a retrieval conveyance system that brings each input bin to the processing station;

a receiving area at the processing station for receiving an input bin containing one or more objects, the processing station including a programmable motion device for grasping and removing a selected object of the one or more objects from the input bin and moving the selected object;

a carrier for receiving the selected object from the programmable motion device, said carrier being adapted to move the selected object as well as being adapted to discharge the selected object from the carrier; and an array of destination locations below the carrier such that the carrier is movable at an elevation above the array of destination locations, each destination location including an open top such that the carrier deposits the selected object into a selected destination location of the plurality of destination locations by tipping the carrier to discharge the selected object into the selected destination location.

12. The automated storage, retrieval and processing system as claimed in claim 11, wherein the programmable motion device includes an articulated arm with a vacuum end-effector.

13. The automated storage, retrieval and processing system as claimed in claim 11, wherein the array of destination locations is provided as at least one pair of rows of destination locations.

14. The automated storage, retrieval and processing system as claimed in claim 11, wherein each destination location is adapted for sealing and shipment for transport.

15. The automated storage, retrieval and processing system as claimed in claim 11, wherein each destination location is provided adjacent an output conveyance system for receiving completed destination containers.

16. The automated storage, retrieval and processing system as claimed in claim 15, further comprising an output bin displacement system for displacing the completed destination containers onto the output conveyance system.

17. The automated storage, retrieval and processing system as claimed in claim 11, wherein the retrieval conveyance system includes an infeed conveyor section that brings any of the plurality of input bins to the processing station.

18. The automated storage, retrieval and processing system as claimed in claim 17, wherein the infeed conveyor section is gravity biased toward the processing station.

19. The automated storage, retrieval and processing system as claimed in claim 18, wherein the retrieval conveyance system includes a bin displacement system for displacing an input bin onto the infeed conveyor section.

20. The automated storage, retrieval and processing system as claimed in claim 19, wherein the retrieval conveyance system includes a return conveyor section that returns any of the input bins to the input bin storage section.

21. A method of storing, retrieving and processing objects, said method comprising:

storing a plurality of input bins at an input bin storage section;

moving a selected input bin of the plurality of input bins to a retrieval conveyance system;

receiving, at a processing station from the retrieval conveyance system, the selected input bin containing one or more objects;

using a programmable motion device, grasping and removing a selected object of the one or more objects from the selected input bin;

moving the selected object to a carrier using the programmable motion device;

moving the carrier;

providing an array of destination locations below the carrier such that the carrier is movable at an elevation above the array of destination locations; and dropping the selected object into a selected destination location of the array of destination locations by tipping the carrier to discharge the selected object into the selected destination location.

22. The method as claimed in claim 21, wherein the programmable motion device includes an articulated arm with a vacuum end-effector.

23. The method as claimed in claim 21, wherein the array of destination locations is provided as at least one pair of rows of destination locations.

24. The method as claimed in claim 21, wherein each destination location is provided adjacent an output conveyance system for receiving completed destination containers.

25. The method as claimed in claim 24, wherein the method further includes displacing the completed destination containers onto the output conveyance system using an output bin displacement system.

26. The method as claimed in claim 21, wherein the method further includes retrieving the plurality of input bins from the input bin storage section on the retrieval conveyance system.

27. The method as claimed in claim 26, wherein the retrieval conveyance system includes an infeed conveyor section that brings any of the plurality of input bins to the processing station.

28. The method as claimed in claim 27, wherein the retrieval conveyance system includes a bin displacement system for displacing the selected input bin onto the infeed conveyor section.

29. The method as claimed in claim 28, wherein the retrieval conveyance system includes a return conveyor section that returns the selected input bin to the input bin storage section.

* * * * *